United States Patent
Keidar

(10) Patent No.: US 8,432,941 B2
(45) Date of Patent: Apr. 30, 2013

(54) METHOD AND APPARATUS FOR SELECTIVE CACHING OF BURST STREAM TRANSMISSION

(75) Inventor: Ron Keidar, Haifa (IL)

(73) Assignee: Qualcomm Incorported, San Diego, CA (US)

(*) Notice: Subject to any disclaimer, the term of this patent is extended or adjusted under 35 U.S.C. 154(b) by 377 days.

(21) Appl. No.: 12/477,782

(22) Filed: Jun. 3, 2009

(65) Prior Publication Data
US 2009/0307740 A1 Dec. 10, 2009

Related U.S. Application Data

(60) Provisional application No. 61/058,570, filed on Jun. 4, 2008.

(51) Int. Cl.
H04J 3/06 (2006.01)
H04J 3/22 (2006.01)
H04H 40/00 (2008.01)
H04N 7/16 (2011.01)

(52) U.S. Cl.
USPC ............. 370/508; 370/468; 455/3.06; 725/62

(58) Field of Classification Search ................... 725/118, 725/120, 130, 150, 62; 348/731, 705, 706; 375/130; 455/455, 464, 516, 185.1, 3.06; 370/468, 508
See application file for complete search history.

(56) References Cited

U.S. PATENT DOCUMENTS

| 4,507,781 | A  | * | 3/1985  | Alvarez et al. ............... 370/266 |
| 7,466,367 | B2 |   | 12/2008 | DaCosta |
| 2003/0166392 | A1 | * | 9/2003 | Laiho et al. ................. 455/3.06 |
| 2004/0120276 | A1 | * | 6/2004 | Golla et al. .................. 370/321 |
| 2007/0142082 | A1 |   | 6/2007 | DaCosta |
| 2007/0188665 | A1 |   | 8/2007 | Watson et al. |
| 2009/0113086 | A1 | * | 4/2009 | Wu et al. ....................... 710/56 |

FOREIGN PATENT DOCUMENTS

| EP | 1879376 | 1/2008 |
| KR | 20070118810 A | 12/2007 |
| WO | 2007024268 | 3/2007 |
| WO | 2008044142 | 4/2008 |

OTHER PUBLICATIONS

DigiTAG, Television on a handheld receiver—broadcasting with DVB-H, 2005, DigiTAG—The Digital Terrestrial Television Action Group, http://www.dvb-h-online.org/PDF/DigiTAG-DVB-H-Handbook.pdf.*
International Search Report, PCT/US2009/046291, International Searching Authority, European Patent Office, Sep. 3, 2009.
Written Opinion, PCT/US2009/046291, International Searching Authority, European Patent Office, Sep. 3, 2009.

* cited by examiner

*Primary Examiner* — Hoang-Vu A Nguyen-Ba
(74) *Attorney, Agent, or Firm* — Fulbright & Jaworski L.L.P.

(57) ABSTRACT

Embodiments relate to systems and methods for the selective caching of burst stream transmissions. A digital video (e.g., DVB-H) or other transport stream can be received on a cellular telephone or other device. The transport stream can be divided into bursts in a sequence of cyclical time slots, each slot carrying one service such as a video channel. The bursts contained in the time slots most distant in time from a currently received time slot can be stored to an onboard cache. When a user wishes to change the service being played, they can select the new desired service. If the user chooses to switch or "zap" to one of the cached services, the media decoder on the device can immediately begin decoding and playing the service encoded in that burst back, rather than waiting for the arrival of the next time slot of the subsequent burst for that service.

60 Claims, 6 Drawing Sheets

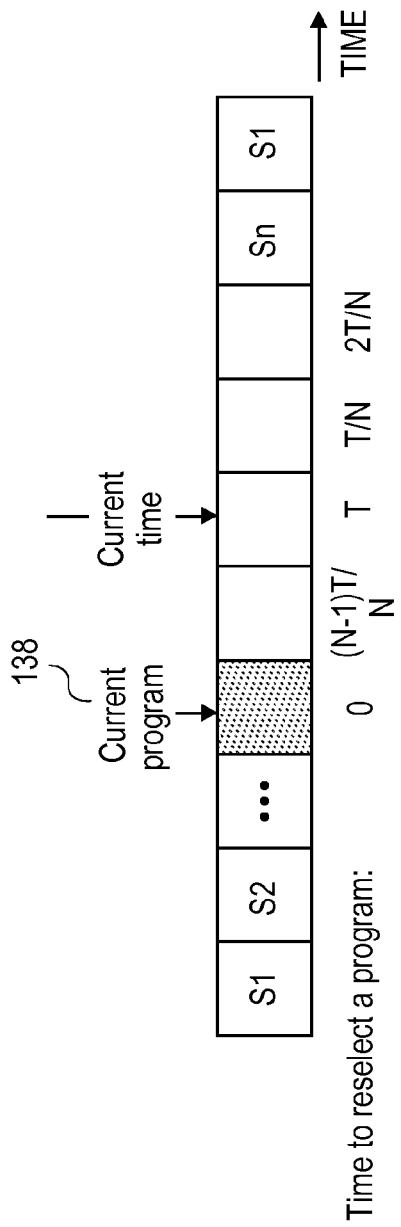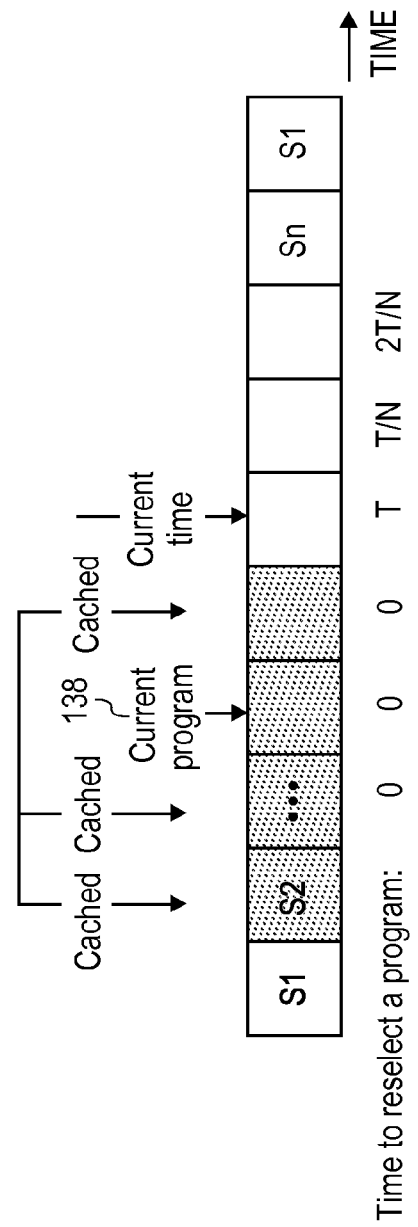

METHOD AND APPARATUS FOR SELECTIVE CACHING OF BURST STREAM TRANSMISSION

CROSS-REFERENCE TO RELATED APPLICATIONS

This application is related and claims priority to U.S. Provisional Application No. 61/058,570, filed Jun. 4, 2008, assigned or under obligation of assignment to the assignee of the present application, entitled "Method and Apparatus for Selective Caching of Burst Stream Transmission," by Ron Keidar, which provisional application is incorporated by reference herein.

BACKGROUND

The increasing bandwidth over the air interface between a wireless server and mobile device has permitted the delivery of video, audio, and other content to cellular telephones and other devices. In the case of digital broadcast video delivered to handheld devices, service providers have been increasingly able to deliver multiple channels of small-screen content to cellular telephones with greater channel selections, resolution, and/or program variety.

However, the advent of multiple video channels on mobile devices and other clients involves some drawbacks or limitations. In the case of the Digital Video Broadcast-Handheld (DVB-H) standard, for instance, several video services or channels can be broadcast at one time, using time-division multiplexing. According to DVB-H formats, DVB-H video can convey Transport Stream (TS) data for several services (e.g., TV Channels) over one frequency channel of approximately 8 MHz bandwidth (or approximately 20 Mbits/sec). A diagram of the time division of a conventional DVB-H broadcast stream is illustrated in FIG. 1. As shown, services (illustratively, five separate programs or services) are transmitted one by one in a time-multiplexed, or time-slicing, mode, where each program or service occupies one time window or slice followed by another program or service in time, in round-robbing or repeating fashion.

In a burst stream transmission such as a DVB-H video program, if a user watches a TV channel on service 2 and would like to change channels, or "zap," to service 1, the user would have to wait until the next time slice or slot assigned to service 1 is received in the device, before the user could actually view that content. In practice, the distance between video bursts or frames would, on average, be about 2 seconds for that time slot rotation using DVB-H. This delay establishes a minimum switching or zapping time for this technology. Processing overhead in the device needed to decode the new selected channel adds more time to the switching lag, resulting in a total of 2-4 seconds or more of delay, while the user waits to view the new video channel or other service. This delay is sufficient to be noticeable, and possibly distracting, to many users. Improved systems for processing video or other burst stream transmissions may be desirable.

SUMMARY

Systems and methods for the selective caching of burst stream transmissions are described, in which bursts occurring in a set of time slots assigned to services are received and selectively cached to reduce total switching or zapping time, on average, compared to conventional burst stream. The available memory in the device may not be sufficient to receive and store a complete set of bursts for an entire set of cyclical time slots. However, the device can generally contain sufficient memory to establish a cache of a subset of the bursts taken from the set of time slots.

The bursts for time slots which lie at the greatest distance in time from a currently received slot can be stored to cache. If a user then decides to change programs or services to select and present a second program or service (e.g., video channel), control logic in the device can determine whether the target service is already stored within the onboard cache. If the burst is stored within the cache, the device can immediately, or nearly immediately, begin to process the content decoding of the destination service directly from the cache. The user will typically perceive a much shorter transition or "zap" delay when new or destination services are read out of cache, as opposed to waiting for the burst in the next time slot corresponding to the newly selected service to arrive. Since the cache can store bursts from time slots that would cause the greatest delay if selected, the average delay to switch or zap across all services can be significantly reduced. Services that do not reside in cache can incur a delay to receive the next available burst for that service, but that average delay will be significantly shorter than those that would have been incurred for the most distant time slots.

DESCRIPTION OF THE DRAWINGS

The accompanying drawings, which are incorporated in and constitute a part of this specification, illustrate aspects of the present teachings and together with the description, serve to explain principles of the present teachings. In the figures:

FIG. 4 illustrates a memory operation for a device receiving a sequence of transmission bursts without caching activity, in various regards;

FIG. 5 illustrates a memory operation including selective caching of transmission bursts, consistent with various implementations of the present teachings;

DETAILED DESCRIPTION

Aspects of the present teachings relate to methods and apparatus for selecting caching of burst stream transmissions. More particularly, in various aspects, platforms and techniques are provided in which operate to selectively store transmission bursts from the most distant time slots in time from a currently received slot in an onboard cache of a recipient device. If a user of the device decides to change or "zap" services, for example from one television or video channel to another, the device determines whether the new selected service resides in the onboard cache. If it does, the device can immediately begin decoding the video or other content directly from the cache, without having to wait for the arrival of the next cyclical time slot containing the next available burst for that corresponding service. Service changes to services that are not contained in the cache can still incur a delay until the next corresponding time slot transmission is received, but this penalty will be less than for those bursts stored to cache. Average zapping delay can thereby be reduced, and user convenience can be enhanced.

Figure 1:
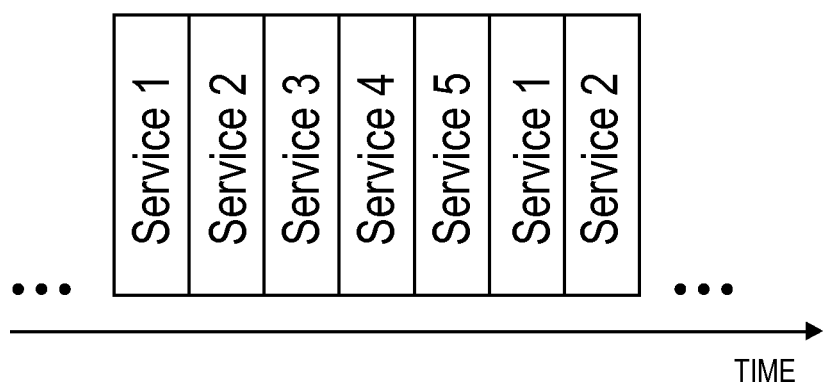
FIG. 1 illustrates a transmission scheme for conventional digital video broadcast formats, in various regards.
Figure 2:
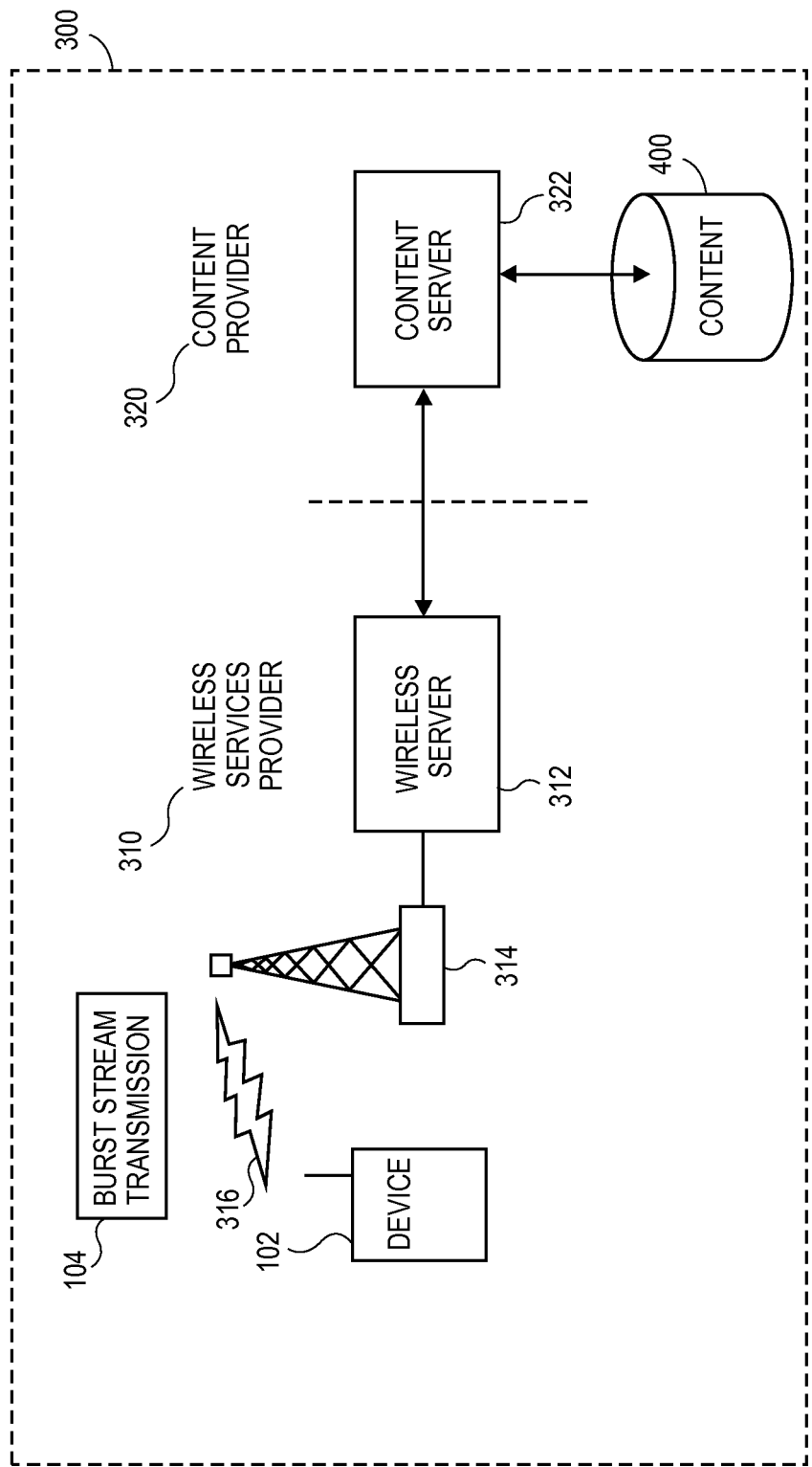
FIG. 2 illustrates an overall wireless network architecture, consistent with various implementations of the present teachings.

FIG. 2 shows a functional block diagram of an exemplary wireless network 300, consistent with aspects of the present teachings. As shown in FIG. 2, wireless network 300 may include a wireless services provider 310 and a content provider 320. Wireless services provider 310 may provide cellular telephony or other digital communications services to users of mobile electronic devices, such as device 102. Wireless services provider 310 may be a cellular telephone and/or data service provider, a personal communications services (PCS) provider, a DVB-H provider, or a provider of other wireless services, programs, or content. Wireless services provider 310 may operate a wireless server 312 and a network of base stations 314. As shown in FIG. 2, device 102 may communicate with wireless server 312 using a client-server architecture over a wireless interface 316 through a set of base stations 314. Other networks, channels, and connections between device 102, content provider 320, wireless services provider 310, and/or other resources can be used.

Content provider 320 may be an internet service provider (ISP), a broadcast video and/or audio provider, or other provider of digital content. Content provider 320 may operate a content server 322 for providing access to digital content 400 stored in computer readable media. Wireless services provider 310 may be linked to content provider 320 through any appropriate communications link 324, such as a Wireless Application Protocol (WAP) gateway, a socket connection including secure socket layer (SSL) connections, or others. In an implementation, wireless services provider 310 may retrieve digital content from content server 322 over a communications link and provide such content to one ore more device 102 over wireless interface 316. However, it is to be understood that the present disclosure is not limited to such an arrangement, and that device 102 may obtain content 400 by other mechanisms. For example, device 102 may be linked to content provider 320 by a land line and, in some implementations, some or all of content 400 may be stored in a memory of device 102.

Figure 3:
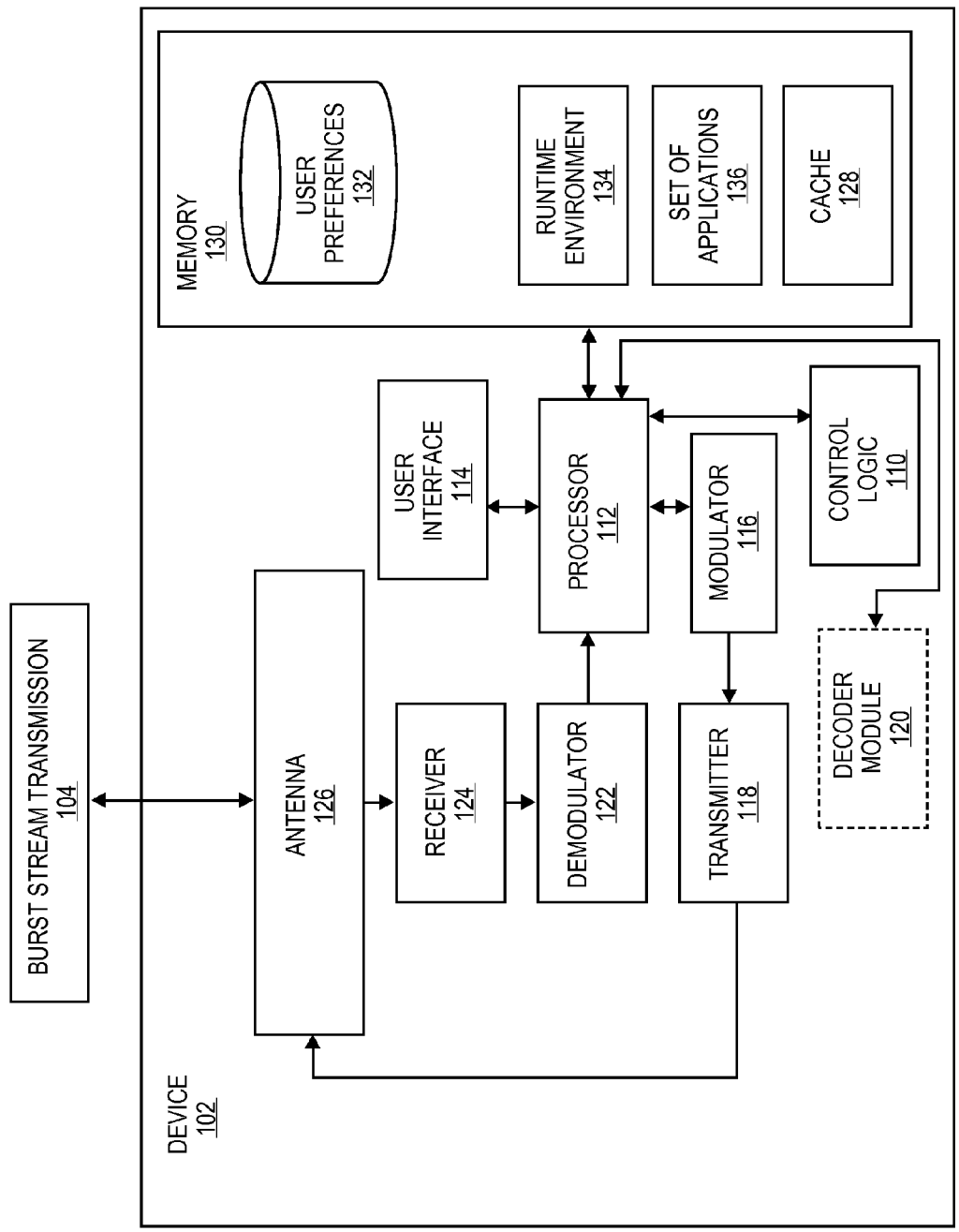
FIG. 3 illustrates an exemplary device that can receive burst stream transmissions, consistent with various implementations of the present teachings.

As shown for instance in FIG. 3, in implementations, device 102 can comprise a set of hardware, software, and connectivity resources to receive a burst stream transmission 104 from content provider 320 and/or other sources. In implementations as shown, device 102 can include at least one antenna 126 (e.g., a transmission receiver or group of such receivers comprising an input interface) that receives a signal (e.g., pertaining to a mobile call initiation or other handshake, a handshake response, a mobile application data transfer, a data event, data event response, handshake termination, and so on) and a receiver 124, which performs actions (e.g., filters, amplifies, down-converts, etc.) on the received signal. Antenna 126 can be further coupled to a modulator 116 and transmitter 118 to transmit signals. Antenna 126 can for example transmit or receive a response to a handshake request, data event request, or the like. Received signals can be or include a burst stream transmission 104, and other data, as described herein. Antenna 126 and receiver 124 can also be coupled with a demodulator 122 that can demodulate received signals and provide the demodulated information to a processor 112 for processing. Device 102 can additionally include memory 130 that is coupled to processor 112 and that can store video, audio, and other data or content to be transmitted, received, and the like.

Processor 112 can receive and process the data from one or more burst stream transmission 104 received via antenna 126, for instance for display via user interface 114 such as a graphical user interface or other graphical display, to display graphics, video, or other content. Additionally, processor 112 can control and/or access one or more resources or components (e.g., 122, 124, 116, 118, 114) of the device 102. Processor 112 can execute a runtime environment 134, such as the Binary Runtime Environment for Wireless (BREW™) available from Qualcomm Inc., as well as one or more set of applications 136 or other software, modules, applications, logic, code, or the like. In aspects, set of applications 136 can include a media playback and/or other applications or resources. Processor 112 can likewise communicate with a set of user preferences 132, such as account access controls, user IDs, or other settings or data.

According to aspects in further regards, processor can further communicate with control logic 110, which an, for instance, be or include application(s) or other software, firmware, hardware, or other logic or resources programmed to control burst stream processing and other functions of device 102. Processor 112 can likewise couple with a cache 128, which in implementations can be or include a subset of memory 130 located in device 102, or separate memory. In implementations, processor can also couple with an optional decoder module 120, for instance, a dedicated video decoder or other device to decode burst stream transmission 104. In implementations, in addition to or instead of the implementations of device 102 that are illustrated in FIG. 3, device 102 can be or include a cellular telephone, a network-enabled personal digital assistant device, a network-enabled media player device, a Global Positioning System (GPS) device, or other mobile or stationary, wired or wireless client, device, or hardware.

In terms of memory operations for receiving a burst transmission stream 104 in device 102 in a time-multiplexed format, FIG. 4 illustrates memory usage according to a baseline or naïve scheme that does not involve selective caching of the data bursts, for purposes of comparison. In aspects as shown, device 102 can be playing or presenting video or other content from a current program 138 while continuing to receive data at a current time. As shown in FIG. 4, assuming that:

N=number of services transmitted on the TS,
T=the time for cycle of all services, and
C=the number of cached bursts, then the average switching or zapping delay that results without the employment of a cache scheme (assuming equal services length) would be:

$$\text{Average switching delay} = (N/2)*(T/N) = T/2.$$

If an entire cycle of time slots before they begin to repeat is 2 seconds, the penalty would therefore be 1 second on average. In some implementations, it may be noted that a burst residing in a time slot can represent a data frame of about 500 Kbits-1 Mbit, or other amounts of data.

It may be noted that in implementations, while wireless server 312 can broadcast an entire set of services continuously, device 102 may only receive or may only decode or process the bursts residing in time slots assigned to a currently selected service for playback, to avoid power drain that would be caused by unnecessary decoding of unselected services. In implementations, device 102 can, therefore, send begin to decode the transmission burst from the time slots of a currently viewed service, program, or channel to onboard logic for decoding while skipping the unselected services, in round-robin fashion.

FIG. 5 illustrates memory operations including selective caching of a burst stream transmission 104, according to implementations of the present teachings. In aspects shown in FIG. 5, device 102 can play or present a current program 138 while device is operating to receive a set of burst data in a current time slot or frame. The most distance time slots therefore comprise those slots (starting with those labeled "S2") which require the greatest number of slots to be repeated before the receiver 124 of device 102 reaches their regular window again. The shaded areas in the sequence of slots in FIG. 5 thereby illustratively mark the set of bursts stored in cache 128. As shown in FIG. 5, with a cache 128 employed in device 102, the most distant bursts in the future from a current time slot are already cached, so their switching delay from current program 138 is zero. It may be noted that while FIG. 5 illustrates a scenario where three additional slots, in addition to the slot for current program 138, are stored to cache 128, in implementations other numbers of slots can be cached. In implementations, the number of slots in cache 128 can be predetermined, or can be made a dynamic function of the amount of free memory 130, or other factors.

In aspects, the cache 128 can consist of electronic random access memory, or other electronic or other memory 130 installed on device 102. In aspects as described herein, "C" can denote the number of cached bursts not including current program (in the illustrated example of FIG. 5, C=3). According to implementations, the cache 128 can be configured to always keep the most distant bursts in time locally available, thus significantly reducing average switching or zapping delay. In implementations, cache 128 can constitute a subset of the resident memory 130 in device 102. In implementations, memory 130 that is available for caching or other operations can be on the order of 2-8 Mbytes, or smaller or larger amounts of memory. According to implementations in one regard, the number of bursts or time slots that can be cached in cache 128 can be a function of available memory 130 in device 102, as well as the data rate of the transport stream used to deliver burst stream transmission 104 and resulting component data bursts received by device 102. Other factors can contribute to the size of the cache 128 employed in device 102.

According to implementations, and as illustrated in FIG. 3, it may be noted device 102 can incorporate a separate decoder module 120. In implementations where a decoder module 120 is used, decoder module 120 can be or include a MPE-FEC (Multiprotocol Encapsulation-Forward Error Correction) module, or DVB-H data burst module, either of which can be incorporated as a dedicated chip, programmed digital signal processor, or other hardware or software resources. It may be noted that in implementations, the burst stream transmission 104 can be or include a DVB-H transport stream (TS), which can be encoded in Motion Pictures Expert Group (MPEG) format, such as MPEG-2 format. Other formats or protocols can also be used. In DVB-H implementations including a dedicated decoder module 120, after receipt of a burst or frame from a burst transmission stream 104, that burst can be passed to onboard software to decode the video or other content.

However, in implementations of the present teachings, none of the cached bursts are moved to software-side decoding or associated processing before selection for switching, so software usage and bus usage are not impacted by the extra data being cached in cache 128. According to implementations of the present teachings, the decoding of each burst of burst transmission stream 104 can be performed using Reed-Solomon (RS) decoding, as understood by persons skilled in the art. In aspects, Reed-Solomon (RS) calculations used for forward error correction purposes can involve significant processing overhead, such as on the order of 250-1000 Reed-Solomon (RS) rows per burst, or other amounts of computational load. In implementations, Reed-Solomon (RS) or other error correction calculations on cached bursts can therefore be avoided until the point that the user selects to switch to a new service occupying different slots in burst stream transmission 104. In implementations, the control logic 110 of device 102 can be configured to be aware that it can request burst data from either the transport stream (TS) itself, or from the cache 128. It may also be noted that in implementations, the portion of cache 128 (and/or memory 130) used to capture the current frame or time slot for viewing can be released and re-used for caching purposes, once the burst content is moved to control logic 110 or other decoding software.

According to implementations in additional regards, operating the device 102 in cached mode can be expensive in terms of power consumption, particularly, for mobile cellular devices having limited battery capacity. According to implementations, therefore, the control logic 110 of device 102 can make predictive assumptions regarding the most likely times for user service switching, and restrict the use of cache 128 to those windows of time. For example, control logic 110, a media playback application located in set of applications 136, or other logic can assume that switching can be anticipated within a predetermined time that the user views an Electronic Service Guide (ESG) or other program listing, since the user may be assumed to be considering alternative content shortly after viewing those options.

In implementations, control logic 110, a media playback application located in set of applications 136, or other logic can also or instead activate cache 128 for a predetermined period after a previous service switch, since a user may be more likely to switch services or change channels within a comparatively short time of viewing a new channel, in "surfing" fashion. Time thresholds of 1 minute, 5 minutes, 10 minutes, or other periods of time between switches or zaps can be selected to activate or deactivate caching activity. Other cache activation techniques can be used to control storage of burst transmission stream 104 to cache 128, and assist in power conservation.

In implementations in further regards, the hardware of device 102 can generate a list of Packet Identifications (PIDs, an elementary stream identifier in an MPEG-2 transport stream) for the cache 128, in addition to conventional lists of Control PIDs and Data PIDs in that format, when that type of encoding is used. According to implementations, the memory allocation of Data PIDs and Cached PIDs can be shared, so that incorporating Cached PIDs should not necessarily increase memory demands when that type of encoding is used.

Figure 6:
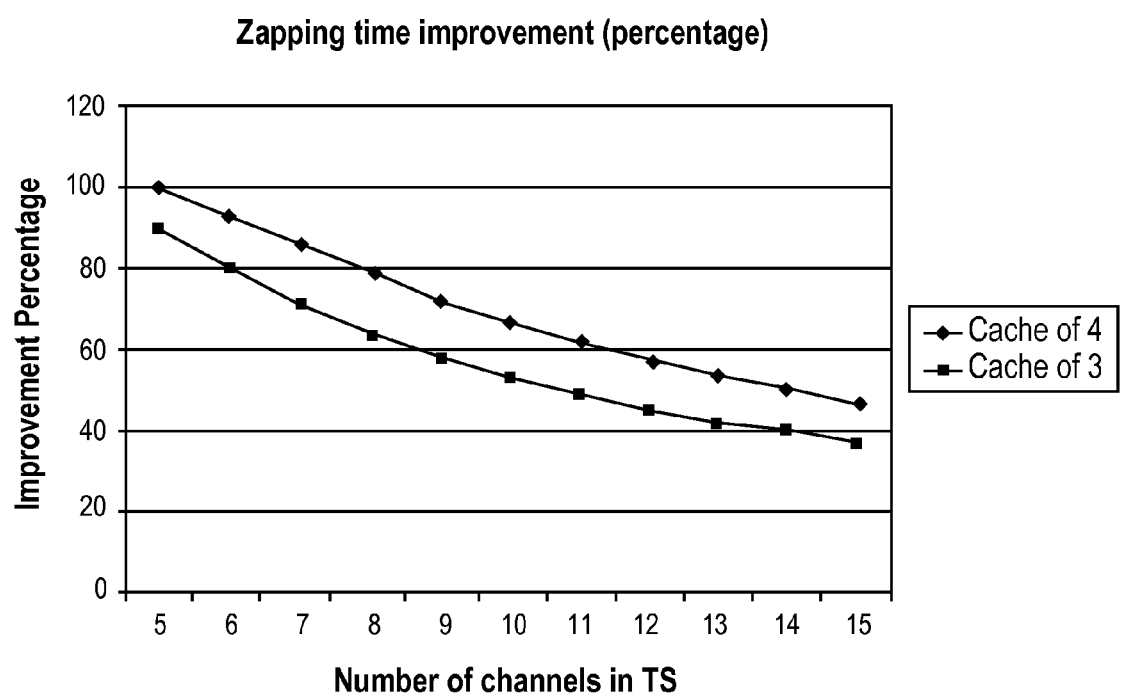
FIG. 6 illustrates switching or zapping time performance curves for devices, using various implementations of the present teachings, according to various aspects.

FIG. 6 illustrates a graph of hardware-based improvement in switching time using selective caching according to the present teachings, in various implementations. The illustrated graph shows the percentage of improvement of cached versus non-cached hardware switching or zapping time for device 102. The percentage improvement shown is calculated as: 100*(1−cached/non cached). The graph analyzes two cases, one with cache 128 storing 3 programs and one with cache 128 storing 4 programs. In the case, for instance, of 4 cached channels, services, or programs and 5 programs per transport stream (TS), a 100% improvement from the non-cached solution is achieved (4 cached+1 playing=5 programs in memory at all times). Improvement is seen for both sets of illustrative cache sizes or lengths, and over the entire illustrated range of total services used for broadcast. Other combinations of cache size, program set, and other variables can be used.

Figure 7:
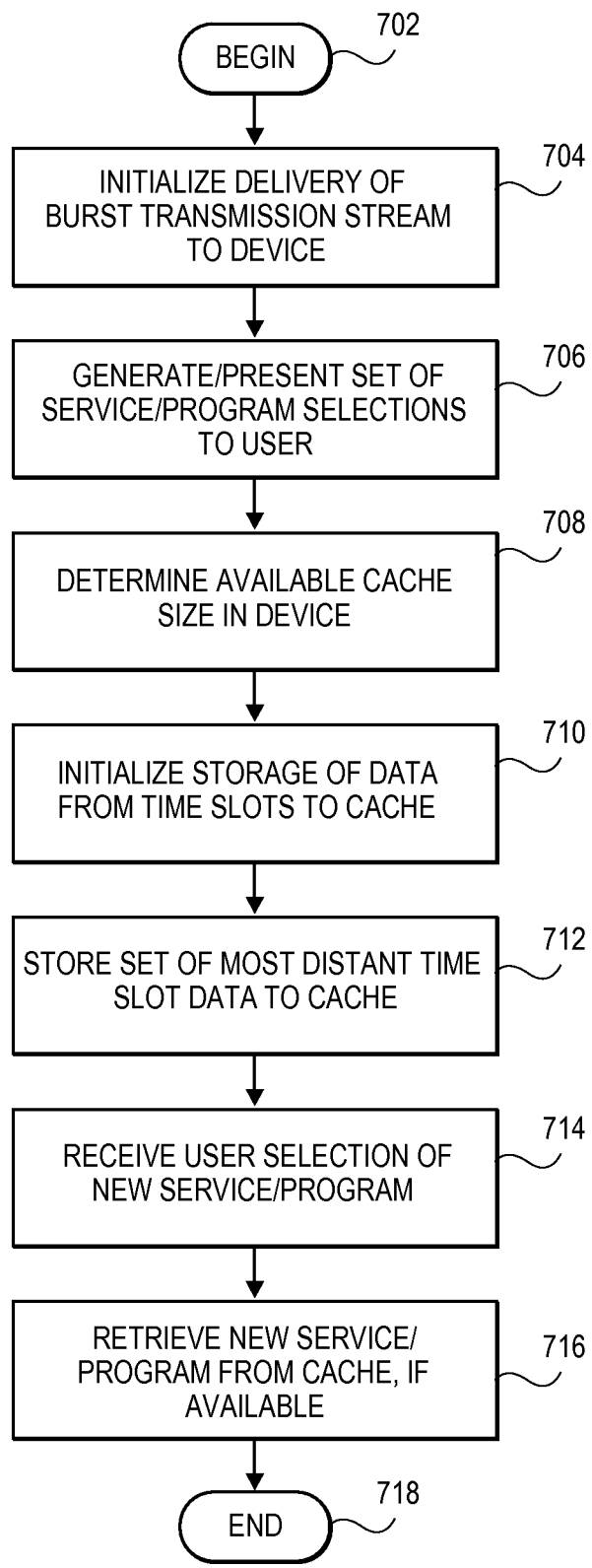
FIG. 7 illustrates a flow diagram of burst transmission caching operations, consistent with various implementations of the present teachings.

FIG. 7 illustrates overall processing that can be used in selective caching of burst stream transmissions, according to various implementations of the present teachings. In 702, processing can begin. In 704, the delivery of burst stream transmission 104 to device 102 can be initialized, for instance, via request of the user of device 102. In 706, a set of service, program, channel or other content selections can be generated and/or presented to a user of device 102, for instance, via a user interface 114 of device 102. In 708, an available size of cache 128 in device 102 can be determined, for instance by control logic 110. In 710, processing to store data from burst transmission stream 104 to cache 128 can be initiated. In 712, the most distant time slots in burst transmission stream 104 from a currently received time slot can be initiated to cache 128, for instance via control logic 110. In aspects, the number of slots from which data is stored to cache 128 can be determined, in part, based on the available amount of cache 128.

In 714, a user selection of a desired new service, program, channel, or other content can be received, for instance by channel or service selection made via user interface 114 of device 102. In 716, the new service, program, channel, or content can be retrieved directly from cache 128 for decoding and viewing, in instances where that data is available within cache 128. In aspects, requests for services or programs outside cache 128 can be received and decoded using conventional processing. In 718, processing can repeat, return to a prior processing point, jump to a further processing point, or end.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

For further example, while implementations have been described in which caching operations are carried out on DVB-H video streams, in implementations caching operations according to the present teachings can be carried out on other video transmission formats, on audio formats, or other burst or time-division multiplexed transmission types or formats. While other implementations have been described in which a single transport stream is presented at one time of the media playback device, in implementations multiple transport streams can be presented and/or cached. Other resources described as singular or integrated can in implementations be plural or distributed, and resources described as multiple or distributed can in implementations be combined. The scope of the present teachings is accordingly intended to be limited only by the following claims.

What is claimed is:

1. A method of transmitting a burst stream transmission, comprising:
   generating a set of cyclical time slots having a predetermined period;
   encoding a set of services in the set of cyclical time slots; and
   transmitting the set of services to a device, the device being configured to—
      receive at least a portion of the encoded set of services in the set of cyclical time slots,
      select at least a first service of the set of services for presentation on the device,
      determine a subset of the set of services encoded in a most distant subset of the set of cyclical time slots from a currently received time slot,
      store exclusively the determined subset of the set of services encoded in the most distant subset of the set of cyclical time slots from the currently received time slot to a cache on the device,
      receive a user request to change the service for presentation on the device from the first service to a second service, and
      retrieve the second service from the cache for presentation on the device when the second service is stored in the cache.

2. The method of claim 1, wherein the set of services comprises at least one of a video service or an audio service.

3. The method of claim 2, wherein each of the set of services comprises a channel of video content or a channel of audio content.

4. The method of claim 3, wherein each of the set of services comprises a channel of video content, and the channel of video content is encoded in the Digital Video Broadcast-Handheld (DVB-H) format.

5. A system for transmitting a burst stream transmission, comprising:
an interface to a device; and
a server, communicating with the interface, the server being configured to—
generate a set of cyclical time slots having a predetermined period;
encode a set of services in the set of cyclical time slots; and
transmit the set of services to the device, the device being configured to—
receive at least a portion of the encoded set of services in the set of cyclical time slots,
select at least a first service of the set of services for presentation on the device,
store a subset of the services encoded in a most distant subset of the set of cyclical time slots from a currently received time slot to a cache on the device,
receive a user request to change the service for presentation on the device from the first service to a second service, and
retrieve the second service from the cache for presentation on the device when the second service is stored in the cache.

6. The system of claim 5, wherein the set of services comprises at least one of a video service or an audio service.

7. The system of claim 6, wherein each of the set of services comprises a channel of video content or a channel of audio content.

8. The system of claim 7, wherein each of the set of services comprises a channel of video content, and the channel of video content is encoded in the Digital Video Broadcast-Handheld (DVB-H) format.

9. A system for transmitting a burst stream transmission, comprising:
means for interfacing to a device; and
means for serving data to the device, communicating with the means for interfacing, the means for serving data being configured to—
generate a set of cyclical time slots having a predetermined period;
encode a set of services in the set of cyclical time slots; and
transmit the set of services to the device, the device being configured to—
receive at least a portion of the encoded set of services in the set of cyclical time slots,
select at least a first service of the set of services for presentation on the device,
store a subset of the services encoded in a most distant subset of the set of cyclical time slots from a currently received time slot to a cache on the device,
receive a user request to change the service for presentation on the device from the first service to a second service, and
retrieve the second service from the cache for presentation on the device when the second service is stored in the cache.

10. The system of claim 9, wherein the set of services comprises at least one of a video service or an audio service.

11. The system of claim 10, wherein each of the set of services comprises a channel of video content or a channel of audio content.

12. The system of claim 11, wherein each of the set of services comprises a channel of video content, and the channel of video content is encoded in the Digital Video Broadcast-Handheld (DVB-H) format.

13. A computer program product, comprising:
non-transitory computer-readable medium comprising:
at least one instruction for causing a computer to generate a set of cyclical time slots having a predetermined period;
at least one instruction for causing a computer to encode a set of services in the set of cyclical time slots; and
at least one instruction for causing a computer to transmit the set of services to a device, the device being configured to—
receive at least a portion of the encoded set of services in the set of cyclical time slots,
select at least a first service of the set of services for presentation on the device,
store a subset of the services encoded in a most distant subset of the set of cyclical time slots from a currently received time slot to a cache on the device,
receive a user request to change the service for presentation on the device from the first service to a second service, and
retrieve the second service from the cache for presentation on the device when the second service is stored in the cache.

14. The computer program product of claim 13, wherein the set of services comprises at least one of a video service or an audio service.

15. The computer program product of claim 14, wherein each of the set of services comprises a channel of video content or a channel of audio content.

16. The computer program product of claim 15, wherein each of the set of services comprises a channel of video content, and the channel of video content is encoded in the Digital Video Broadcast-Handheld (DVB-H) format.

17. A method of processing a burst stream transmission, comprising:
receiving at least a portion of a set of services encoded in a set of cyclical time slots having a predetermined period in a device;
receiving a selection of at least a first service of the set of services for presentation on the device;
storing a subset of the services encoded in a most distant subset of the set of cyclical time slots from a currently received time slot to a cache on the device;
receiving a user request to change the service for presentation on the device from the first service to a second service; and
retrieving the second service from the cache for presentation on the device when the second service is stored in the cache.

18. The method of claim 17, wherein the set of services comprises at least one of a video service or an audio service.

19. The method of claim 18, wherein each of the set of services comprises a channel of video content or a channel of audio content.

20. The method of claim 19, wherein each of the set of services comprises a channel of video content, and the channel of video content is encoded in the Digital Video Broadcast-Handheld (DVB-H) format.

21. The method of claim 20, wherein the channel of video content is encoded in a Motion Pictures Expert Group (MPEG) format.

22. The method of claim 17, wherein the device comprises at least one of a cellular telephone, a Global Positioning System (GPS) device, a network-enabled personal digital assistant device, and a network-enabled media player device.

23. The method of claim 17, wherein the most distant subset of the set of cyclical time slots comprises a subset of at least the three most distant time slots from the currently received time slot.

24. The method of claim 17, wherein presentation of a selected service on the device comprises communicating the selected service to a software module to perform error correction decoding.

25. The method of claim 17, wherein the at least a portion of the set of encoded services comprises only the time slots associated with the selected at least first service for presentation.

26. The method of claim 17, further comprising deactivating the storing of a subset of the services encoded in a most distant subset of the set of cyclical time slots from a currently received time slot to a cache when a user request to change the service for presentation has not been received in a predetermined period.

27. The method of claim 17, wherein the receiving comprises receiving via a wireless interface to the device.

28. A device, comprising:
an interface to a server; and
a processor, communicating with the interface, the processor being configured to—
receive at least a portion of a set of services encoded in a set of cyclical time slots having a predetermined period in a device,
receive a selection of at least a first service of the set of services for presentation on the device,
store a subset of the services encoded in a most distant subset of the set of cyclical time slots from a currently received time slot to a cache on the device,
receive a user request to change the service for presentation on the device from the first service to a second service, and
retrieve the second service from the cache for presentation on the device when the second service is stored in the cache.

29. The device of claim 28, wherein the set of services comprises at least one of a video service or an audio service.

30. The device of claim 29, wherein each of the set of services comprises a channel of video content or a channel of audio content.

31. The device of claim 30, wherein each of the set of services comprises a channel of video content, and the channel of video content is encoded in the Digital Video Broadcast-Handheld (DVB-H) format.

32. The device of claim 31, wherein the channel of video content is encoded in a Motion Pictures Expert Group (MPEG) format.

33. The device of claim 28, wherein the device comprises at least one of a cellular telephone, a Global Positioning System (GPS) device, a network-enabled personal digital assistant device, and a network-enabled media player device.

34. The device of claim 28, wherein the most distant subset of the set of cyclical time slots comprises a subset of at least the three most distant time slots from the currently received time slot.

35. The device of claim 28, wherein presentation of a selected service on the device comprises communicating the selected service to a software module to perform error correction decoding.

36. The device of claim 28, wherein the at least a portion of the set of encoded services comprises only the time slots associated with the selected at least first service for presentation.

37. The device of claim 28, wherein the device is further configured to deactivate the storing of a subset of the services encoded in a most distant subset of the set of cyclical time slots from a currently received time slot to a cache when a user request to change the service for presentation has not been received in a predetermined period.

38. The device of claim 28, wherein the interface comprises a wireless interface to the device.

39. A device, comprising:
means for interfacing to a server; and
means for processing data, communicating with the means for interfacing, the means for processing data being configured to—
receive at least a portion of a set of services encoded in a set of cyclical time slots having a predetermined period in a device,
receive a selection of at least a first service of the set of services for presentation on the device,
store a subset of the services encoded in a most distant subset of the set of cyclical time slots from a currently received time slot to a cache on the device,
receive a user request to change the service for presentation on the device from the first service to a second service, and
retrieve the second service from the cache for presentation on the device when the second service is stored in the cache.

40. The device of claim 39, wherein the set of services comprises at least one of a video service or an audio service.

41. The device of claim 40, wherein each of the set of services comprises a channel of video content or a channel of audio content.

42. The device of claim 41, wherein each of the set of services comprises a channel of video content, and the channel of video content is encoded in the Digital Video Broadcast-Handheld (DVB-H) format.

43. The device of claim 42, wherein the channel of video content is encoded in a Motion Pictures Expert Group (MPEG) format.

44. The device of claim 39, wherein the device comprises at least one of a cellular telephone, a Global Positioning System (GPS) device, a network-enabled personal digital assistant device, and a network-enabled media player device.

45. The device of claim 39, wherein the most distant subset of the set of cyclical time slots comprises a subset of at least the three most distant time slots from the currently received time slot.

46. The device of claim 39, wherein presentation of a selected service on the device comprises communicating the selected service to a software module to perform error correction decoding.

47. The device of claim 39, wherein the at least a portion of the set of encoded services comprises only the time slots associated with the selected at least first service for presentation.

48. The device of claim 39, wherein the device is further configured to deactivate the storing of a subset of the services encoded in a most distant subset of the set of cyclical time slots from a currently received time slot to a cache when a user request to change the service for presentation has not been received in a predetermined period.

49. The device of claim 39, wherein the means for interfacing comprises means for providing a wireless interface to the device.

50. A computer program product, comprising:
non-transitory computer-readable medium comprising:
at least one instruction for causing a computer to receive at least a portion of a set of services encoded in a set of cyclical time slots having a predetermined period in a device;
at least one instruction for causing a computer to receive a selection of at least a first service of the set of services for presentation on the device;
at least one instruction for causing a computer to store a subset of the services encoded in a most distant subset of the set of cyclical time slots from a currently received time slot to a cache on the device;
at least one instruction for causing a computer to receive a user request to change the service for presentation on the device from the first service to a second service; and
at least one instruction for causing a computer to retrieve the second service from the cache for presentation on the device when the second service is stored in the cache.

51. The computer program product of claim 50, wherein the set of services comprises at least one of a video service or an audio service.

52. The computer program product of claim 51, wherein each of the set of services comprises a channel of video content or a channel of audio content.

53. The computer program product of claim 52, wherein each of the set of services comprises a channel of video content, and the channel of video content is encoded in the Digital Video Broadcast-Handheld (DVB-H) format.

54. The computer program product of claim 53, wherein the channel of video content is encoded in a Motion Pictures Expert Group (MPEG) format.

55. The computer program product of claim 50, wherein the device comprises at least one of a cellular telephone, a Global Positioning System (GPS) device, a network-enabled personal digital assistant device, and a network-enabled media player device.

56. The computer program product of claim 50, wherein the most distant subset of the set of cyclical time slots comprises a subset of at least the three most distant time slots from the currently received time slot.

57. The computer program product of claim 50, wherein presentation of a selected service on the device comprises communicating the selected service to a software module to perform error correction decoding.

58. The computer program product of claim 50, wherein the at least a portion of the set of encoded services comprises only the time slots associated with the selected at least first service for presentation.

59. The computer program product of claim 50, wherein the non-transitory computer-readable medium further comprises at least one instruction for causing a computer to deactivate the storing of a subset of the services encoded in a most distant subset of the set of cyclical time slots from a currently received time slot to a cache when a user request to change the service for presentation has not been received in a predetermined period.

60. The computer program product of claim 50, wherein the receiving comprises receiving via a wireless interface to the device.

* * * * *